United States Patent [19]

Bouyoucos

[11] Patent Number: 5,646,909
[45] Date of Patent: Jul. 8, 1997

[54] PNEUMATIC GUN FOR RAPID REPETITIVE ACOUSTIC FIRING

[75] Inventor: John V. Bouyoucos, Pittsford, N.Y.

[73] Assignee: Hyroacoustics Inc., Rochester, N.Y.

[21] Appl. No.: 502,704

[22] Filed: Jul. 14, 1995

[51] Int. Cl.$^6$ ............................................. H04R 23/00
[52] U.S. Cl. ............................ 367/144; 181/115; 181/120
[58] Field of Search ............................ 367/144; 181/115, 181/120

[56] References Cited

U.S. PATENT DOCUMENTS

| | | | |
|---|---|---|---|
| 4,623,033 | 11/1986 | Harrison, Jr. | 367/144 |
| 4,825,973 | 5/1989 | Harrison | 367/144 |
| 5,001,679 | 3/1991 | Harrison | 367/144 |
| 5,228,010 | 7/1993 | Harrison | 367/144 |
| 5,315,917 | 5/1994 | Mayzes | 367/144 |
| 5,365,493 | 11/1994 | Harrison | 367/144 |

OTHER PUBLICATIONS

A New Generation Air Gun, E. R. (Harry) Harrison and L. M. Glacoma, Dec., 1994.

Primary Examiner—J. Woodrow Eldred
Attorney, Agent, or Firm—M. Lukacher

[57] ABSTRACT

A pneumatic gun having a fast-acting sliding sleeve valve member reciprocating between two axial positions, first to open an exhaust port for the explosive release of gas from a pressurized charge chamber in a stationary housing while simultaneously closing a pressurized intake port to said chamber, and then to close said exhaust port while simultaneously opening said pressurized intake port for recharging said charge chamber, all for the purpose of generating repetitive trains of impulsive sounds at a rapid rate with increased efficiency. The sliding valve member comprises a sleeve and may include a piston in a cylinder within the housing. The sliding valve member has a sealing flange which forms a lip seal with a stationary annular mating surface of the gun to close an exhaust port. A wall of the charge chamber is provided with an intake port in communication with a source of high-pressure gas. The intake port is closed when the exhaust port is opened by the sliding action of the sleeve valve member, and is opened when the lip seal is formed to close the exhaust port. The sleeve is fitted with an annular cocking flange which is disposed in a cocking chamber supplied with high-pressure gas which exerts a continuous closing force against the cocking flange to form and maintain the lip seal except for those periods when the gun is actuated. A portion of one of the mating surfaces forming the lip seal is relieved to provide an activating chamber. High-pressure gas is provided selectively to the activating chamber generating in the activating chamber an opening force against the sealing flange, which force is larger than the closing force exerted against the cocking flange, thereby breaking the lip seal and permitting gas to acceleratively discharge from the charge chamber. In the piston embodiment, the acoustic output of the gun includes not only the explosive acceleration of gas from the exhaust port, but also the abrupt volume acceleration off the face of the piston.

19 Claims, 8 Drawing Sheets

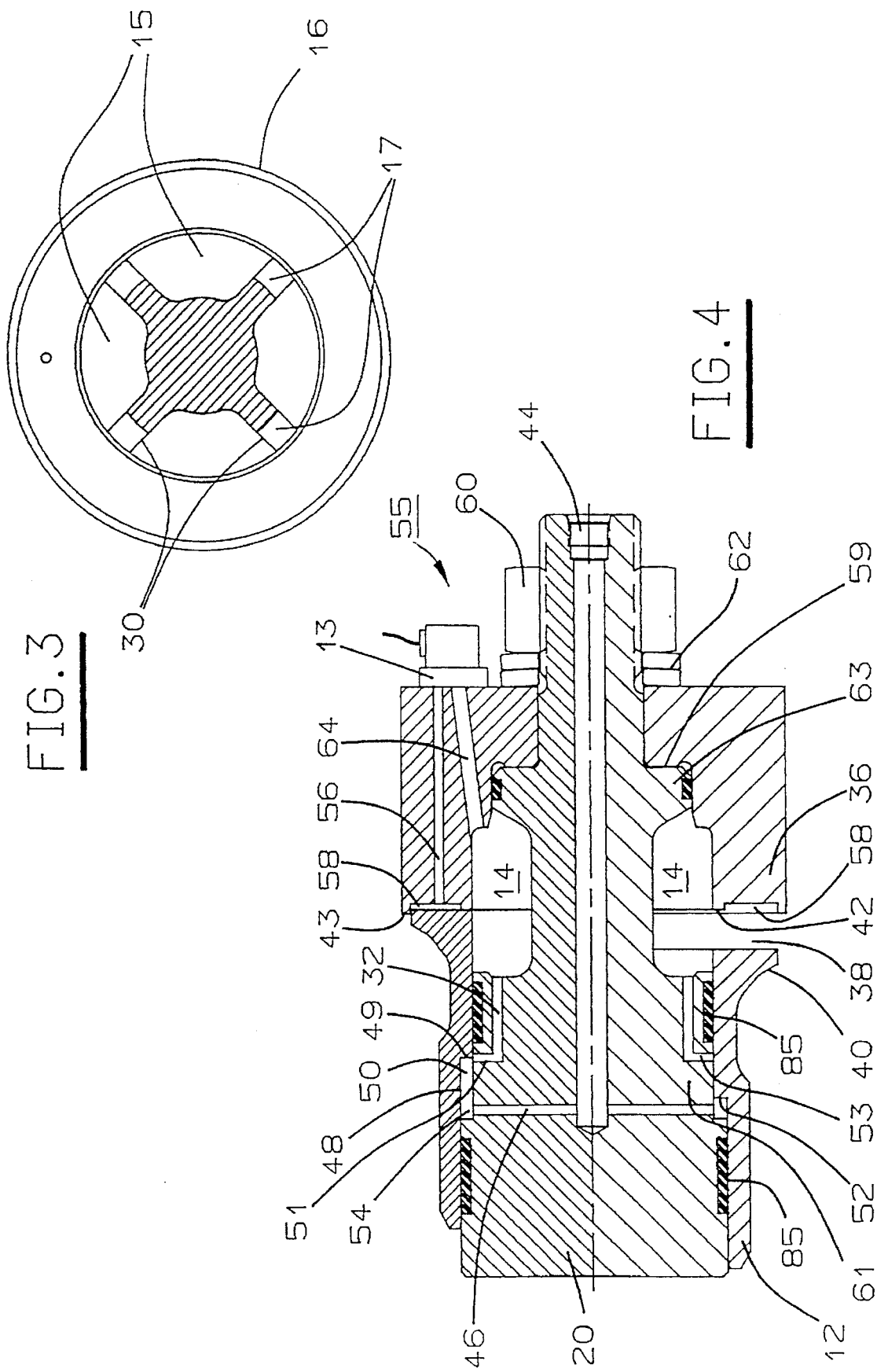

PNEUMATIC GUN FOR RAPID REPETITIVE ACOUSTIC FIRING

DESCRIPTION

The present invention relates to high-pressure, pneumatic guns used for acoustic echo ranging, particularly to such guns used for seismic surveying in water or for echo ranging off underwater objects, and most particularly to guns providing a very sharp onset to an acoustic wave.

Shock waves for acoustic echo ranging underwater typically are produced by explosives, spark discharges, or the abrupt release of a compressed gas volume. Guns powered by compressed gas for this purpose are known in the art.

An important performance criterion for an acoustic gun is the abruptness with which its charge can be released, as this influences directly the intensity, or amplitude, of the acoustic wave being produced and, hence, the efficiency of the gun. The maximum acoustic pressure pulse occurs when the gas volume-discharge acceleration is maximum. Thus, it is desirable that the exhaust port be very large, that is, not significantly limiting to flow, and that the port move from tightly closed (restraining gas at, typically, about 2000 psi) to fully open in the shortest possible time. Ideally, the exhaust porting of a gun is non-limiting, and the bubble of compressed gas is free to expand at a maximum rate governed only by the laws of hydrodynamics. All known guns are non-ideal to varying degrees. Since a finite time is required to open a discharge orifice, and since the compressed gas will expand faster than any known port can be opened, it is important that the discharge area open rapidly enough to support the desired gas acceleration while the bubble is escaping the gun. Although such pneumatic guns can be operated with any compressible gas, the preponderance of use is with compressed air. Accordingly, hereinafter the word air will be used exclusively, with it being understood that it represents generically the broader term gas.

In many acoustic echo ranging applications, it is desirable to fire an apparatus repeatedly at short intervals to create a pulse train. This requires that a gun be capable of rapid recharging. Firing frequencies of 2 to 20 Hz may be needed. U.S. Pat. No. 4,108,272 discloses a rapid-firing acoustic gun, but the disclosed gun is port-limited and requires compressed air supplies at two different pressures.

Early proposed guns were port-limited, that is, once an internal shuttle valve was opened to expose a plurality of equatorial ports in the gun housing, the flow area as defined by the collective size of the ports was fixed and substantially less than the product of the shuttle circumference and its stroke. U.S. Pat. Nos. 4,114,723; 4,246,979; and 4,713,800 disclose port-limited acoustic guns.

Early guns also typically had the high-pressure supply isolated from the charge chamber by small-bore passages, sometimes in the shuttle itself, to control the fill rate of the charge chamber. The substantial throttling inherent in such a pneumatic supply resulted in relatively slow cycling of the gun between discharges. Typically in prior air guns, the high-pressure supply continued to flow to the charge chamber during discharge of the gun, which did not contribute to the intensity of the pulse, was wasteful of energy, and potentially could stall the gun from repetitive firing by preventing the timely closure of the shuttle.

More recently, external shuttle air guns have been proposed. The shuttle is on the outside of a generally cylindrical housing or gun body and is moved axially to expose a 360° equatorial opening. Disclosed guns, however, typically are still hampered in rate of firing repetition due to relative slowness of the charge chamber to refill with compressed air. U.S. Pat. Nos. 4,623,033; 5,001,679; and 5,228,010 disclose such external-shuttle guns.

Known external-shuttle guns are limited to firing rates of about one shot per second, and are relatively inefficient sources of acoustic pulse trains. Attempts to increase the firing rate by increasing the size of the supply passages can result in stalling of the gun mechanism. Typically, pressure within the gun increases too rapidly to allow the shuttle valve to close fully after a first shot, rendering the gun inoperable.

The inefficiency of known guns is compounded by a need for large, massive sleeve valves to accommodate the particular activation mechanisms used for these guns. The heavier the sleeve, the slower the valve opens, and thus the more gradual is the onset of the pressure pulse and the lower the maximum amplitude wave obtainable for a given initial stored energy.

It is a principal object of the invention to provide an improved acoustic gun having a light-weight sleeve valve, a large discharge port, and a short sleeve stroke, which gun can create a sharp intense acoustic pulse with high energy efficiency.

It is a further object of the invention to provide an improved acoustic gun wherein the flow of high-pressure air into the charge chamber is restricted to periods when the exhaust port is closed, and to close off the flow of high-pressure air into the charge chamber when the exhaust port is open.

It is a still further object of the invention to provide an improved acoustic gun capable of firing at peak pressure many times per second to provide a string of acoustic pulses within a short interval.

It is a still further object of the invention to provide an improved acoustic gun requiring a single compressed air supply for both actuation and impulse generation.

It is a still further object of the invention to provide an improved acoustic gun having a sleeve valve which controls not only the timing of the explosive release of compressed air from the gun, but also the timing of the introduction of compressed air into a charge chamber of the gun.

It is a still further object of the invention to provide an improved acoustic gun wherein the flow of compressed air into and out of a charge chamber is regulated at a wall of the charge chamber by a single sliding valve member.

It is still a further object of the invention to provide an improved acoustic gun wherein a single sliding valve member opens the inlet port to a charge chamber only when the exhaust port is closed, and opens the exhaust port from the charge chamber only when the inlet port is closed.

It is a still further object of the invention to provide an improved acoustic gun which can be used in an array of such guns to be fired in synchronization to provide a train of broadband, high power, directive acoustic impulses for echo ranging purposes.

Briefly described, an acoustic gun embodying the invention comprises a housing having a charge chamber therein and also a sliding valve member which closes or opens intake and exhaust ports in a wall of the charge chamber. At one extreme of action of the sliding member, a first flange on the sliding member mates with a flange area on the housing to form a lip seal to close the exhaust port, and an intake port to the charge chamber is opened to a high-pressure air source. A second flange on the sliding member is also exposed to high-pressure air in a cocking chamber, thereby selectively biasing the sliding valve member to exert a closing force on the lip seal at the discharge port. The mating surface of one of the flanges forming the lip seal is relieved outboard of the seal to form an activating chamber which can be provided selectively with high-pressure air through a solenoid valve. When the activating chamber is thus pressurized, an activating force is exerted against the sliding valve member, which force is greater than the closing force exerted in the cocking chamber, thereby selectively urging the sliding valve member toward its second position and opening the lip seal. The pressure of the compressed gas in the charge chamber augments the activating force once the lip seal is broken and further accelerates the opening of the sleeve valve. Simultaneously, the compressed air in the charge chamber discharges explosively from the exhaust port, creating the desired acoustic pulse. The sliding valve member in moving toward its opposite extreme position closes the intake port to the high-pressure air source, thereby sealing off the charge chamber from the high-pressure source as the chamber exhausts. High-pressure air is supplied to the cocking chamber at all times, so that when the discharge pressure in the charge chamber drops sufficiently, pressure in the cocking chamber acts to drive the sliding member back to the first extreme wherein the lip seal is reformed, the intake port to the charge chamber is reopened to the high-pressure source, and the gun is recharged for another firing cycle.

The foregoing and other objects, features, and advantages of the invention, as well as presently preferred embodiments thereof, will become more apparent from a reading of the following description in connection with the accompanying drawings in which:

FIG. 3 is a cross-sectional view of the gun of FIGS. 1 and 2 taken along line 3—3;

FIG. 4 is a longitudinal cross-sectional view like FIG. 1, showing another embodiment of a gun comprising an external sleeve valve;

Each of the acoustic gun embodiments described hereinbelow has a single axially-slidable valve member which, during its service cycle, opens an exhaust port adjacent to a charge chamber while simultaneously closing an intake port; and then following the exhaustion of compressed air from the charge chamber, spontaneously closes the exhaust port while simultaneously opening the intake port to the charge chamber. Upon completion of the charging process the gun is ready for the next firing cycle.

An acoustic gun in accordance with the invention may have either an external or internal sliding valve member. Preferably, the sliding valve member is formed from a strong, light-weight alloy high strength steel or titanium to provide low mass and to thereby allow for rapid cycling of the apparatus.

Figure 1:
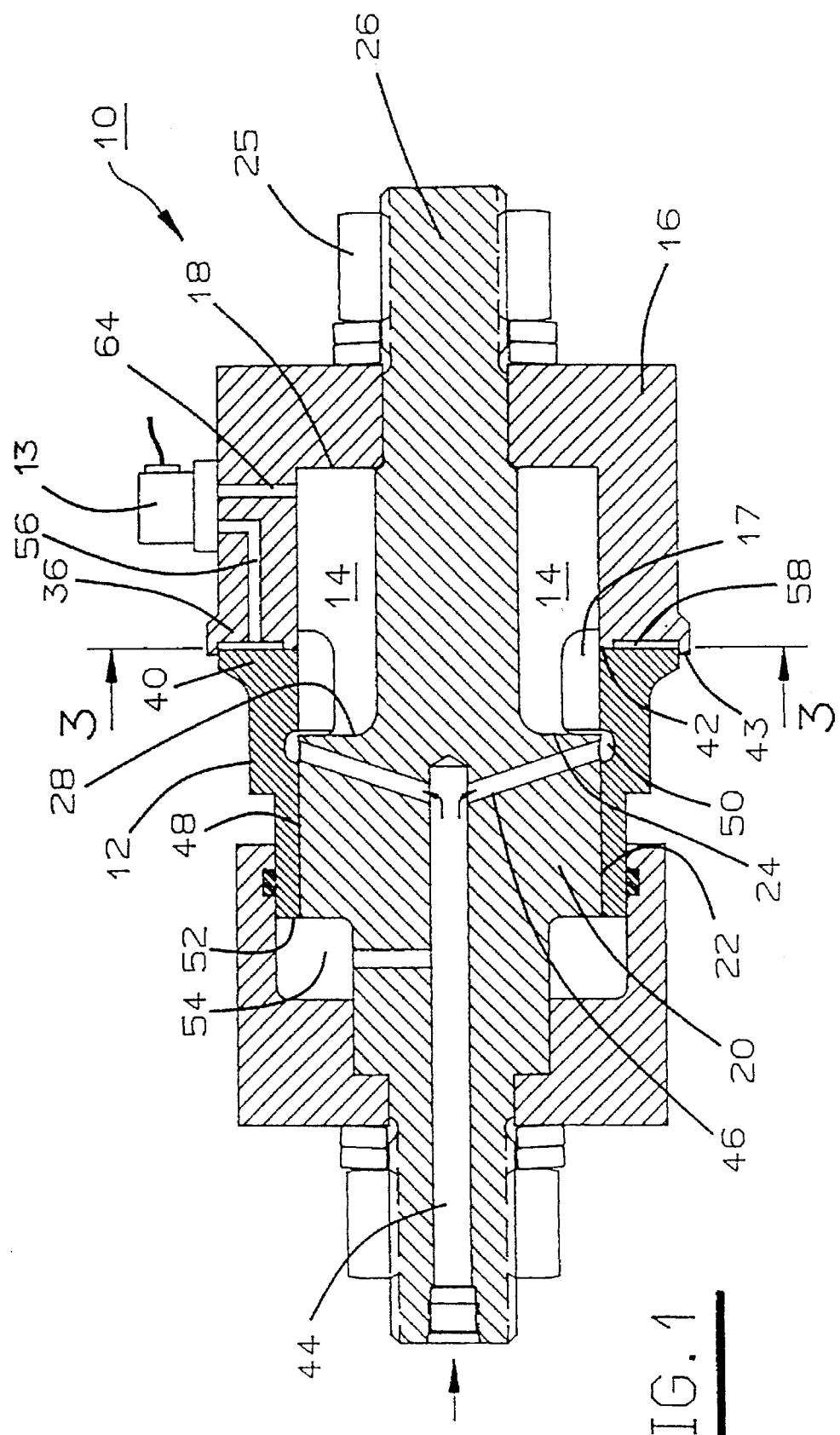
FIG. 1 is a longitudinal cross-sectional view of an acoustic gun in accordance with the invention, showing an external sliding valve member in the form of a sleeve or shuttle valve in a first, or closed, position.
Figure 2:
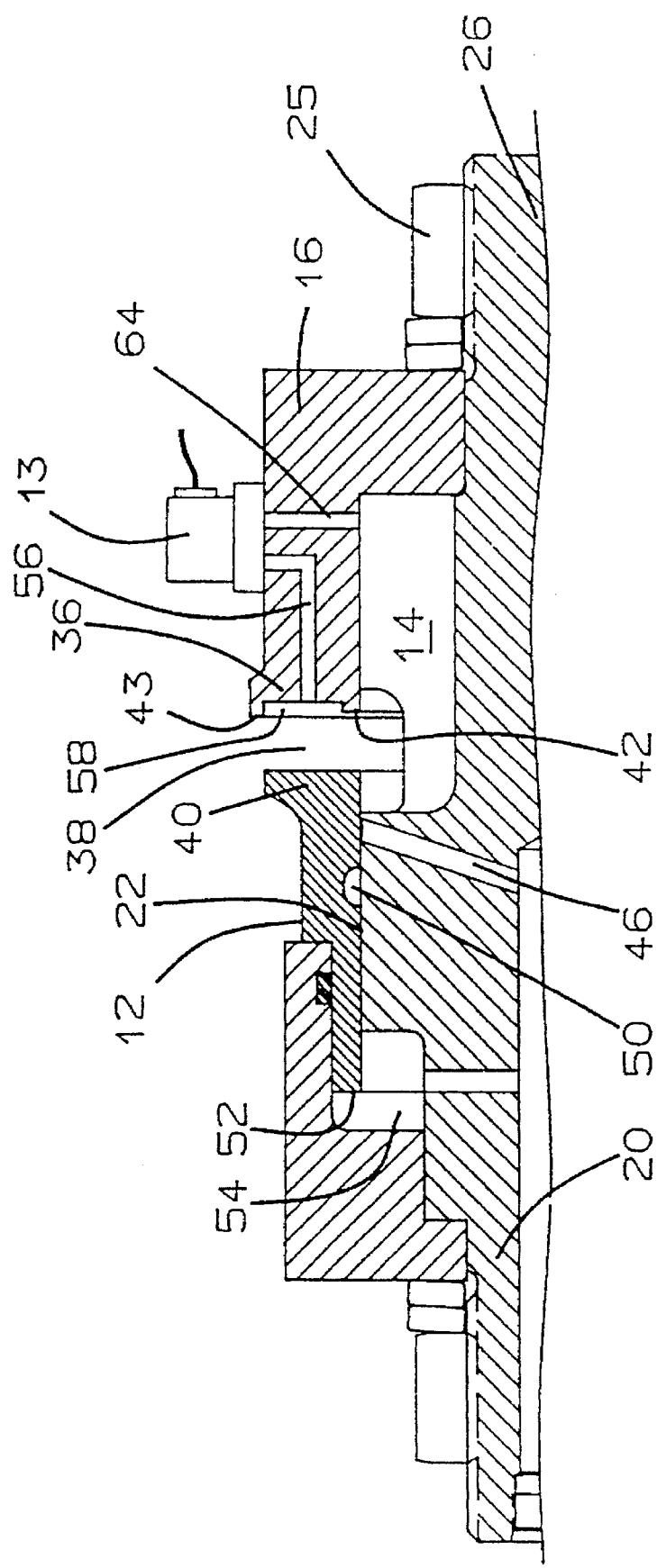
FIG. 2 is a longitudinal cross-sectional view like FIG. 1, showing a portion of the acoustic gun with the sleeve valve in a second, or open, position.

Referring to FIGS. 1 through 3, a first embodiment of the gun 10 has an external sliding valve member 12. A charge chamber 14 is provided in a housing 16 which closes one end 18 of chamber 14. A gun body 20 having a generally cylindrical outer surface 22 and a planar face 24 is connected coaxially to housing 16 as by a throughbolt 26 and nut 25 and thereby closes the other end 28 of the charge chamber 14. The charge chamber may be comprised of a plurality of sub chambers 15, illustrated in FIG. 3, separated by longitudinal and radial supports or webs 30 which support the wall of housing 16 and provide alignment with respect to the gun body 20. Sub chambers 15 mutually communicate through openings 17 in webs 30 such that the sub chambers collectively constitute charge chamber 14.

Housing 16 is provided with a stationary radial flange 36 which defines one side of an equatorial exhaust port 38. Sleeve valve 12 is provided with a sealing flange 40 and is disposed to slide axially on the gun body 20. The sealing flange on the sleeve valve defines the opposite side of exhaust port 38 when the valve is open and can mate with the radial flange 36 to form a lip seal 42 which closes the charge chamber. High-pressure gas is provided through a supply conduit 44 in the gun body 20 to a plurality of radial ports 46 in the cylindrical surface 22 of the gun body. The sleeve valve 12 is relieved on its inner surface 48 to provide an annular recess 50 such that, when the sleeve is at its closed position, the radial ports 46 communicate with charge chamber 14 through the annular recess 50 to permit recharging of the charge chamber with high-pressure air in readiness for another firing cycle.

The sleeve valve 12 is also provided with a skirt defining a cocking flange 52 which is disposed in an annular cocking chamber 54 in the gun body 20. The cocking chamber is supplied with high-pressure air which exerts an axial force $F_c$ on the slide valve to close the discharge port and form the lip seal In a second embodiment 55, shown in FIG. 4, the annular recess 50 is a step in the inner wall 48 of the sleeve valve, whereby the cocking chamber 54 also serves as an intake manifold in the sleeve. When the leading edge 49 of sleeve valve 12 passes beyond radial edge 51 of groove 53 an opening is provided to passageway leading into charge chamber 14 to recharge the chamber. (The gun in FIG. 4 is shown, for brevity of presentation, with the upper and lower sections of the sleeve valve in, respectively, closed and open positions. The physical sleeves is, of course, rotationally symmetric.)

An acoustic gun in accordance with the invention is connected to a high-volume source of compressed air, generally at a pressure exceeding 1000 psi, and in some applications exceeding 2000 psi. Compressed air is provided continuously via supply conduit 44 to the manifold and thence into the charge chamber when the sliding valve member is in the first (closed) position, the charge chamber thereby acquiring an amount of compressed air preferably at pressure equilibrium with the air source. Compressed air is also provided continuously to the cocking chamber 54, wherein the closing force $F_c$ is equal to the product of the area of the cocking flange 52 times the pressure of the air.

Another passage 56 within the gun connects the compressed air source via a selection means to a recess, preferably an annular groove outboard of lip seal 42, which groove defines an activating chamber 58 between flanges 36 and 40. When the sleeve valve 12 is in its closed position, as in FIG. 1, the actuating chamber 58 is closed at its outer periphery by legs 43 which overlap the outer surface of flange 40. The area of the flange 40 exposed to the annular groove is greater than the annular area of the cocking flange 52 generating the closing force. Thus, when the air path 56 to the activating chamber is momentarily selected, as by the abrupt opening of a solenoid valve 13 in the path, an opening force $F_o$ greater than the closing force $F_c$ is generated on flange 40 causing the sliding valve member 12 to begin to move, breaking the lip seal. Upon the breaking of the seal the solenoid valve may return to its closed position. When the lip seal 42 is broken the charge volume of compressed gas then begins immediately to escape and violently thrusts the sliding member to the wide-open second position shown in FIG. 2. The outward acceleration of the expanding gas bubble creates a very sharp, intense acoustic pulse. When the pressure within the charge chamber drops sufficiently, the closing force $F_c$ still present in the cocking chamber returns the sliding member to its first or closed position, re-exposing the supply groove 50 to chamber 14 and restarting the charging of chamber 14. The gun can be cycled at up to at least 20 Hz.

The embodiment of FIG. 4 shows that high-pressure air can be supplied through the housing end of a gun, as well as through the gun body end as shown in FIGS. 1 and 2. Further, the gun body may be formed as by machining to include the charge chamber in a single piece and may be secured to the housing as by a nut 60 and bellville washers 62, with the parallelism of the mating faces 58 on the housing and on the valve flange 40 being maintained by the step flange 63 in the body 20 of the gun.

Figure 5:
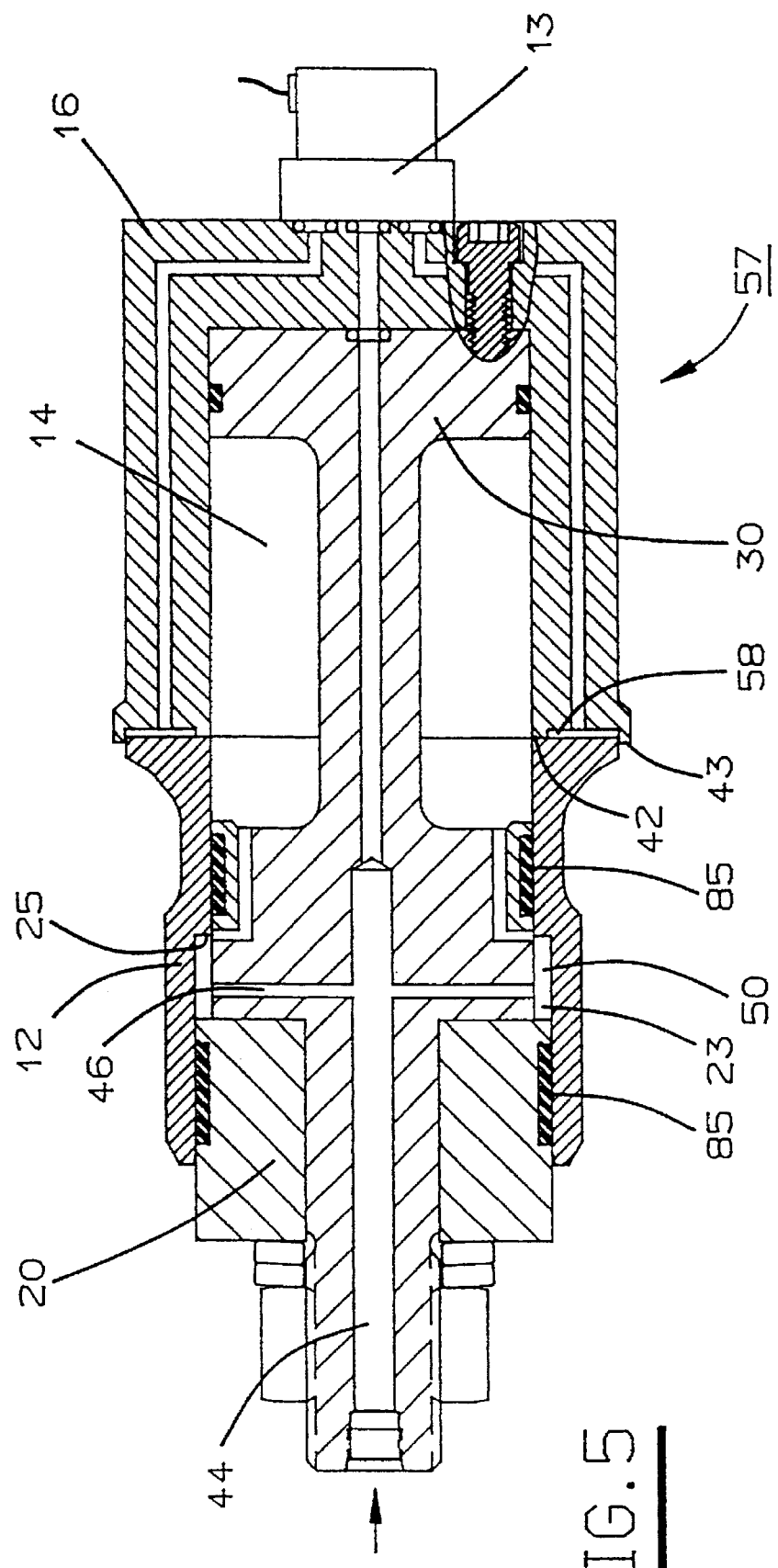
FIG. 5 is a longitudinal cross-sectional view like FIG. 1, showing a further embodiment of a gun comprising an external sleeve valve.

The embodiment of FIG. 5 shows high-pressure supply conduit 44 extending through the length of the gun body to supply solenoid valve 53 directly. In the two previously-described embodiments, the solenoid is supplied via a separate passage 64 from the charge chamber. Also shown in FIG. 5 is an annular chamber 23 in the body. A shoulder 25 of the valve 12 enters this chamber 23, after having closed off the intake passageway 46, and the air therein acts as a cushion which assists in stopping and turning around the valve 12.

Figure 6:
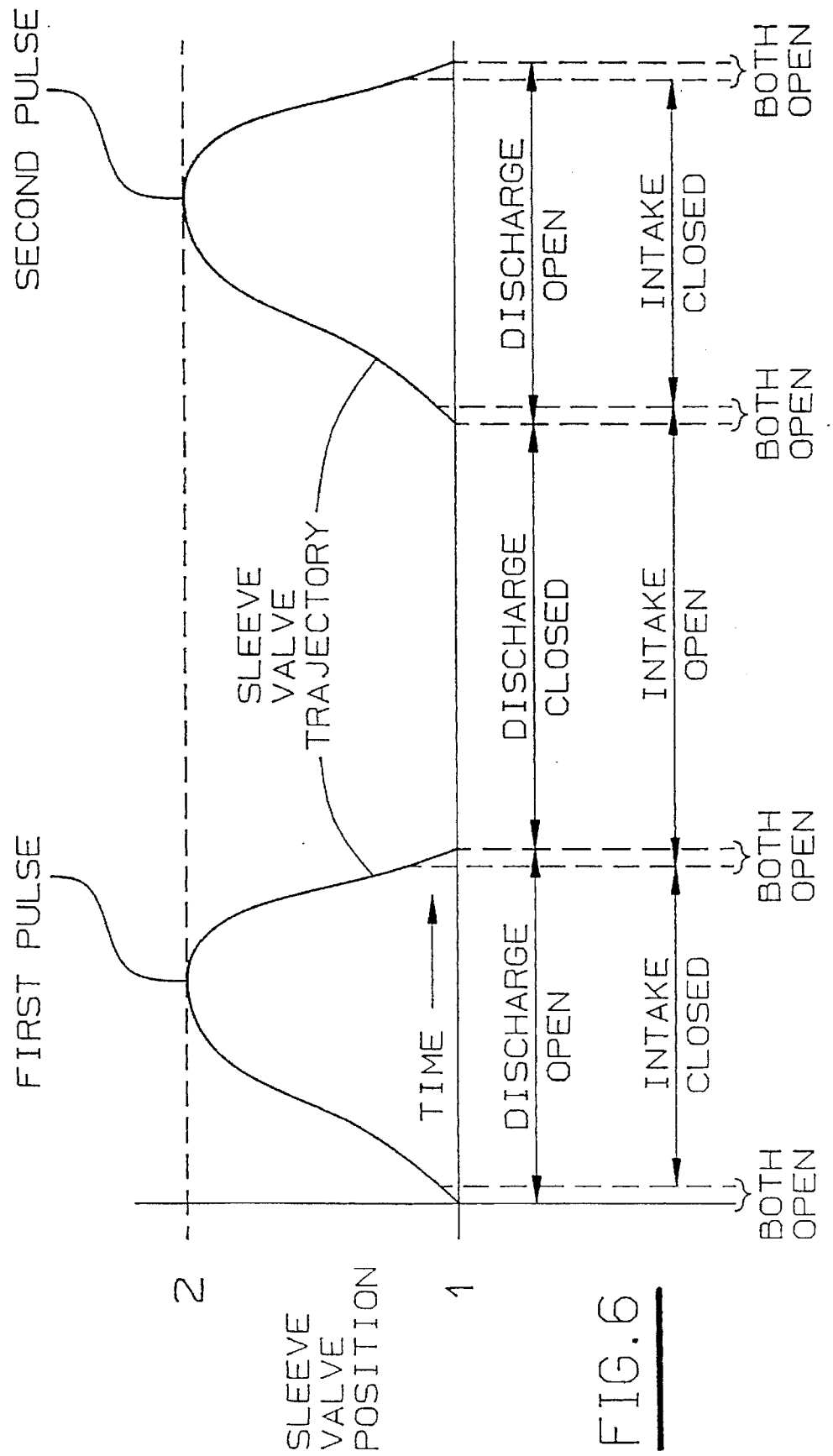
FIG. 6 is a diagram of a repetitive operating cycle of a gun in accordance with the invention.

A diagram of the repetitive flow and actuation cycle of an acoustic gun in accordance with the invention is shown in FIG. 6. The open and closed periods of the intake and discharge or exhaust ports, and the brief periods of overlap, are shown as controlled by the movement of a sliding valve member.

Figure 7:
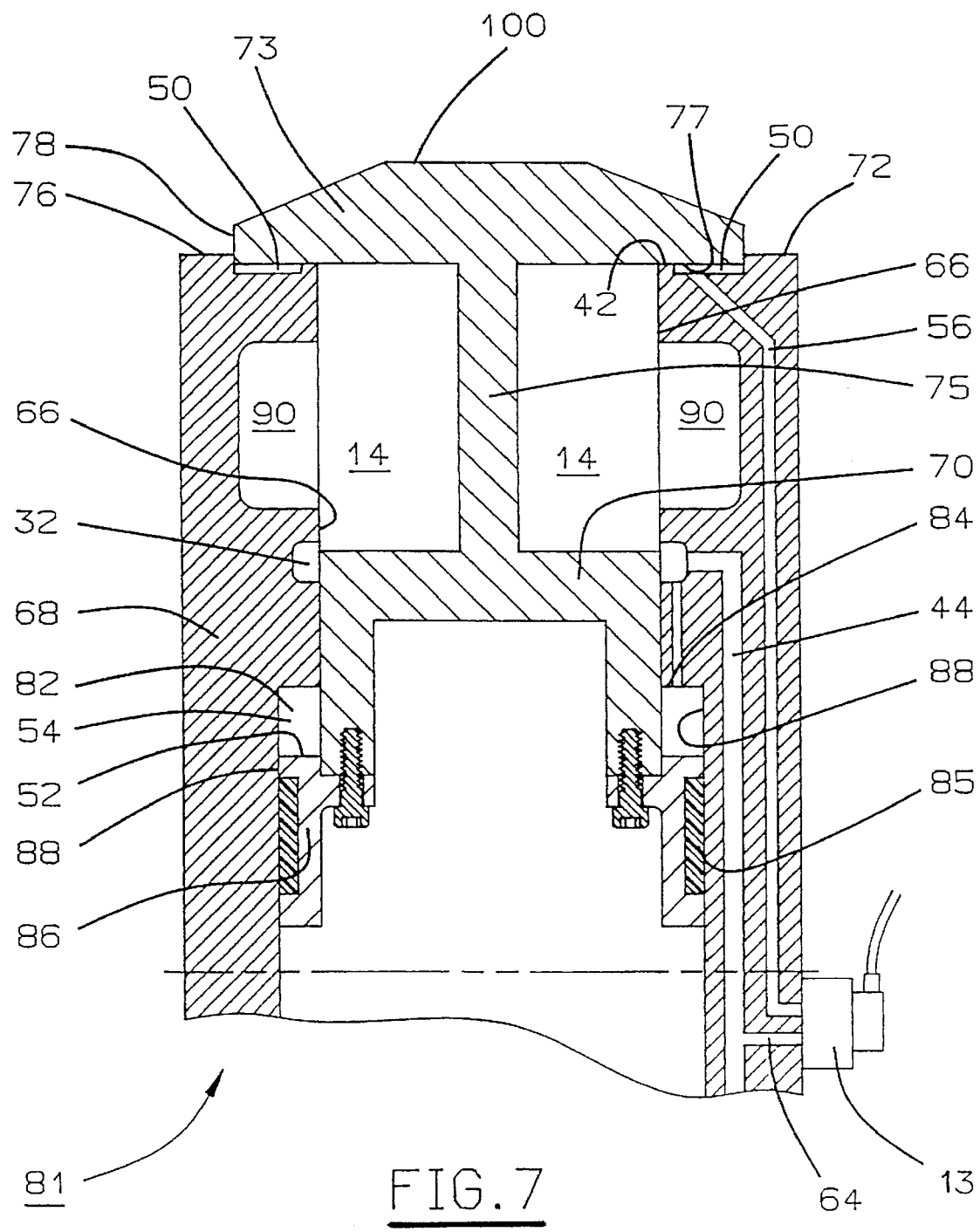
FIG. 7 is a longitudinal cross-sectional view of an acoustic gun in accordance with the invention, showing an internal sliding valve member in the form of a piston in a first, or closed, position.
Figure 8:
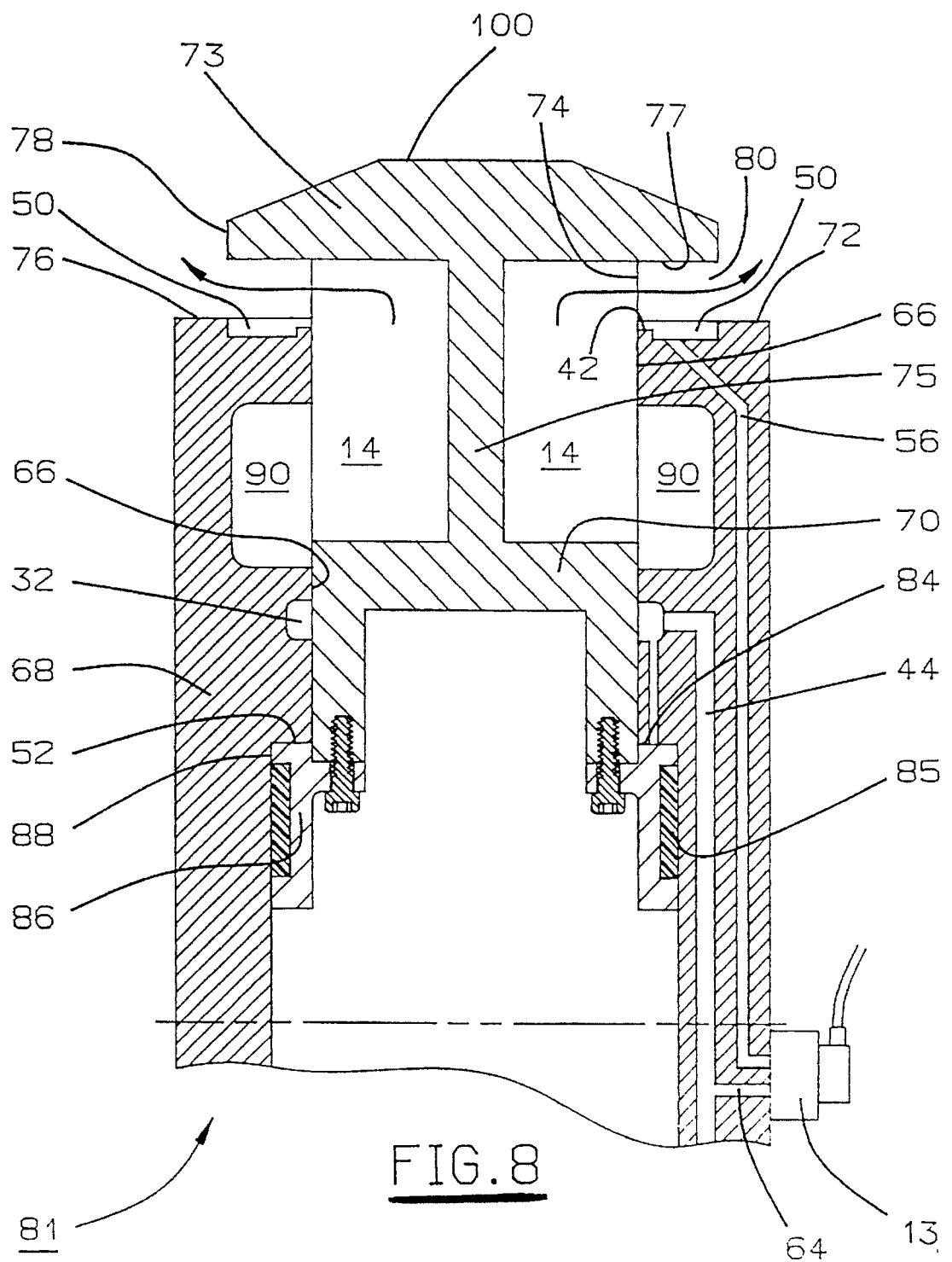
FIG. 8 is a longitudinal cross-sectional view like FIG. 7, showing the piston in a second, or open, position.

An embodiment having an internal sliding valve member is shown in FIGS. 7 and 8. An axial bore 66, preferably cylindrical, is provided in a wall of a housing 68, and a sliding valve member in the form of a piston 70 is disposed to reciprocate axially within the bore between two positions. In FIG. 8, the piston is shown extending beyond the end 72 of the bore 66, which defines an exhaust opening 74 through a first wall 76 of the housing 68. Piston 70 terminates in a flanged cap 73 having a diameter larger than the bore. Within the bore, the piston has milled-out regions 14 with flange-like appendages 75 extending out to the cylindrical surface of bore 66, and which act as a guide for piston motion in bore 66. These milled-out regions 14 provide a charge chamber 14 within the piston in communication with the bore. In a first or closed position, the flange 77 of the cap 73 fits within the first wall 76 and forms a lip seal 42 around the exhaust port, thereby closing off the charge chamber from the environment outside the gun. In a second or open position, at the extreme opposite end of the piston stroke, the flanged cap is disposed at a distance from exhaust opening 74, creating thereby a cylindrical exhaust port 80 (FIG. 8) which preferably has a larger area than the cross-sectional area of the charge chamber 14. Thus the exhaust port does not limit or retard significantly the exhausting of gas from the charge chamber.

An intake manifold 32, preferably annular, is provided in the surface of the first axial bore at a distance from the outer end of the bore such that the manifold is covered by the piston over most of the piston stroke and is opened to the charge chamber only by an amount equal to the overlap of the land 78 in the wall 76, at the extreme end of the piston stroke as it returns to the first position. The supply of high-pressure air to the charge chamber thus is abruptly shut off by the action of the piston (and also, of course, by the sleeve in external-sleeve embodiments) as soon as the piston begins to move, thereby conserving energy, allowing for rapid, unopposed closing of the exhaust port, following release of the stored gas in charge chamber 14, and preventing the stalling of the sliding valve member in mid-stroke return as is seen in some prior art acoustic guns.

Within the housing 68 is a second axial bore 82 larger in diameter than the first axial bore 66, and coaxial and contiguous with it, forming an annular step 84 at the juncture of the two bores. The piston extends into the second bore and has an appended annular flange 86 extending radially to, and slidably sealing against, the surface 88 of the second bore with air seals 85. Such air seals may comprise, for example, a dry lubricant such as graphite disposed between two slidable O-rings. When the piston is in the second position (exhaust port fully open) as shown in FIG. 8, the annular flange is stopped against the annular step. When the piston is in the first position (exhaust port fully closed) as shown in FIG. 7, the annular flange is spaced apart from the step by a distance equal to the stroke of the piston, forming an annular cocking chamber 54 among the annular flange, the piston wall, the step, and the second bore. As in the external-sleeve embodiments previously discussed, a closing force $F_c$ is present at all times within the cocking chamber 54 and is overcome by the programmed creation of a superior opening force $F_o$ in an activating chamber between flanges forming a lip seal to the charge chamber. Preferably, the piston has a large diameter, short stroke, and low mass to enable very rapid increase in the open area of the discharge port as the gun fires.

To increase the volume of gas to be discharged, and thus the power of the gun, the size of the charge chamber 14 may be increased by providing an auxiliary charge chamber 90, preferably annular, within housing 68.

Figure 9:
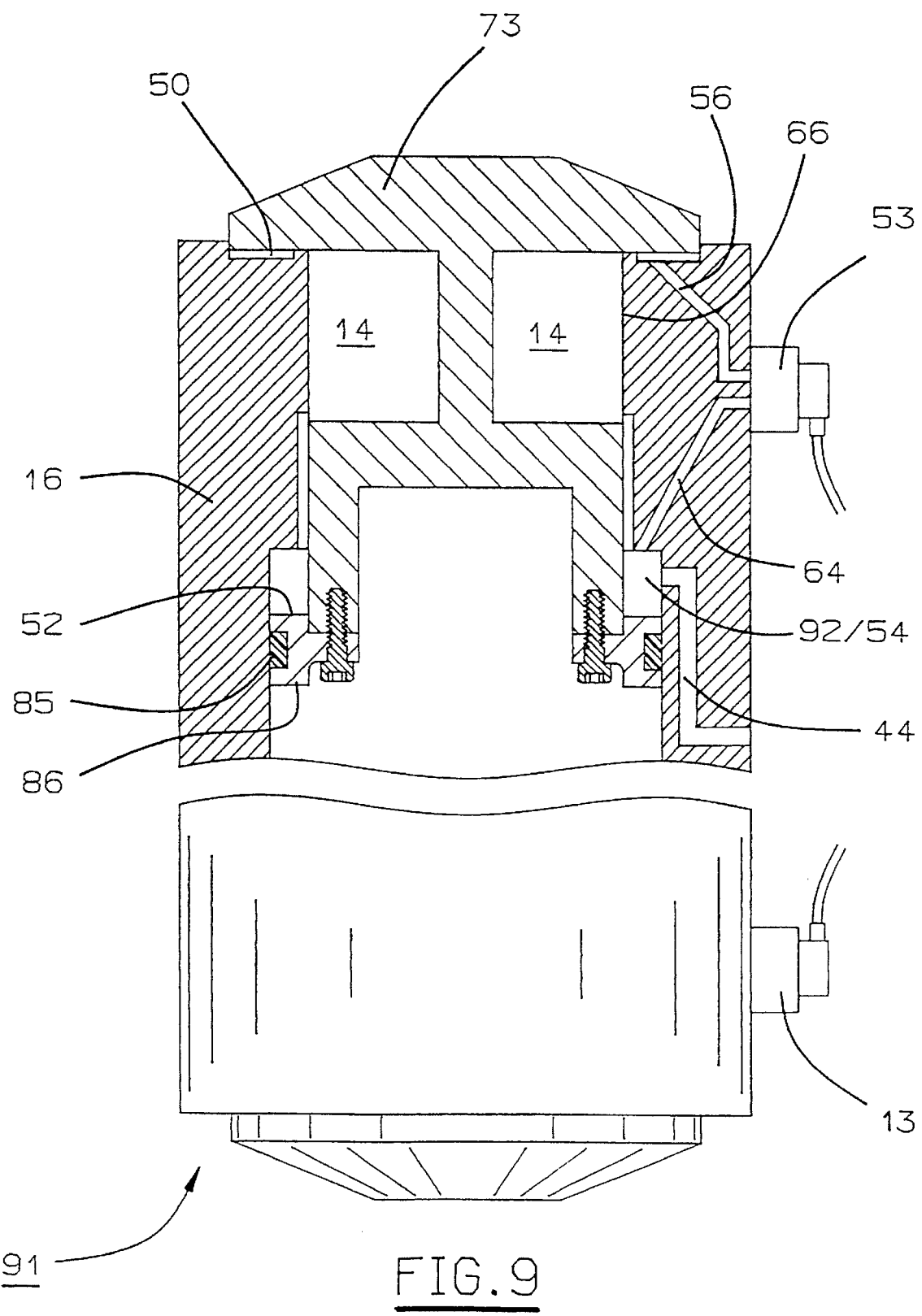
FIG. 9 is a longitudinal view, partially in crossection, of a pair of opposed guns like the gun shown in FIGS. 7 and 8.

The discharge of the embodiment of FIGS. 7 and 8, which is axial, can create a large axial recoil of the apparatus. It is advantageous, therefore, to provide such guns as opposed pairs, as shown in FIG. 9, whereby the recoil of each gun is nullified by the opposing recoil of its twin. Synchronous firing can be achieved by synchronized action of the respective solenoid valves. The axial length of the assembly 91 can be reduced by combining manifold 92 and cocking chamber 54.

Upon firing of the gun configuration of FIGS. 7 and 8, in addition to the explosive acceleration of gas out of the cavity 14 through port 80, thereby forming an acoustic impulse in the external medium, the accelerative motion of the piston face 100 creates a further acoustic impulse that is coincident and additive to that provided by the gas evolution. Depending on the relative dimensions and volumes chosen, the respective impulses may be tailored in amplitude and spectral characteristics to provide desired signatures.

From the foregoing description it will be apparent that there has been provided an improved pneumatic acoustic gun for rapid repetitive firing, wherein movement of a light-weight sliding valve member, either external or internal, rapidly opens a large exhaust port permitting very rapid discharge of compressed air in a single, high-energy pulse. Further augmentation of this pulse can be provided by the piston acceleration of certain embodiments. Variations and modifications of the herein described gun, in accordance with the invention, will undoubtedly suggest themselves to those skilled in this art. Accordingly, the foregoing description should be taken as illustrative and not in a limiting sense.

What is claimed is:

1. A gas gun for use with a source of pressurized gas and operative to generate acoustic pulses in an underwater environment, said gun comprising:
   a) a housing containing a charge chamber for storing an amount of said pressurized gas and an inlet port and an exhaust port in communication with said charge chamber for flow of said gas, said housing having a first mating face adjacent to said exhaust port;
   b) a first valve having a second mating face, being matable with said first mating face in a first position thereby forming a lip seal closing said exhaust port, said first valve being slidably movable with respect to the housing along an axis normal to said mating faces to a second position opening said exhaust port while closing said inlet port, said first valve having a third face disposed in a plane perpendicular to said axis to which said third face pressurized gas is continually applied to urge said first valve toward said first mating face with a closing force $F_c$, said first and second mating faces being relieved over a portion of their mating surfaces to provide an activating chamber therebetween;
   c) a second valve for selectively connecting said source of pressurized gas via a passageway to said activating chamber to create therein an opening force $F_o$ greater than said closing force $F_c$ to cause said first valve to move from said first position to break said lip seal and permit explosive discharge of said amount of pressurized gas from said charge chamber.

2. The gas gun according to claim 1 wherein said housing has means utilizing said closing $F_c$ to return said valve to said first position to close said exhaust port and to open said inlet port following said discharge of gas from said charge chamber.

3. A gas gun in accordance with claim 1 wherein said slidable valve member closes said exhaust port and opens said intake port when in said first position, and opens said exhaust port and closes said intake port when in said second position.

4. A gas gun in accordance with claim 1 wherein said second valve comprises a solenoid.

5. A gas gun in accordance with claim 1 wherein said gun contains a cocking chamber in which said third face of said slidable valve is exposed to said compressed gas, said cocking chamber being in continuous communication with said gas source.

6. A gas gun in accordance with claim 1 wherein said gas is air.

7. A gas gun in accordance with claim 1 wherein said gas pressure is greater than 1000 pounds per square inch.

8. A gas gun in accordance with claim 1 wherein said first valve comprises a sleeve.

9. A gas gun in accordance with claim 1 wherein said first valve comprises a piston.

10. A gas gun for use with a source of pressurized gas and operative to generate acoustic pulses in an underwater environment, said gun comprising:
    a) a housing having a charge chamber, said chamber having an intake and exhaust port through a wall of said housing, and said housing having an annular sealing surface forming a portion of said exhaust port;
    b) a piston moveable within said housing, said piston having a substantially cylindrical outer surface;
    c) a sleeve valve forming a part of said piston for limited reciprocal movement between first and second positions;
    d) a sealing flange on said sleeve valve for forming a lip seal against said annular housing sealing surface to close said chamber to the atmosphere surrounding said housing when said sleeve valve is in said first position;
    e) conduit and porting means for admitting an amount of pressurized gas from a source to said charge chamber when said sleeve valve is in said first position, said conduit and porting means including an annular groove relieved in a surface of said sleeve in communication with said source and in selective communication with said charge chamber in said housing;
    f) means for selectively biasing said sleeve valve to said first position while said amount is being admitted to said charge chamber; and
    g) means selectively biasing said sleeve valve toward said second position to close said pressurized gas source to said charge chamber and to open said charge chamber to the exterior of said housing permitting discharge of said pressurized gas from said chamber to the surrounding atmosphere to create an acoustic pulse.

11. A gas gun in accordance with claim 10 wherein said annular groove is closed from said charge chamber when said sleeve valve is in said second position.

12. A gas gun in accordance with claim 10 wherein deselection of said means for biasing said sleeve valve to said second position automatically causes said sleeve valve to be biased again to said first position.

13. A gas gun for use with a source of pressurized gas and operative to generate acoustic pulses in an underwater environment, said gun comprising:
    a) a housing having a bore defining an opening in a wall of said housing;
    b) a piston disposed for limited reciprocal movement within and beyond said bore between first and second axial positions, said piston having a charge chamber therein in communication with said bore;
    c) a flange on said piston for forming a lip seal against a portion of said housing wall to close said chamber to the atmosphere surrounding said housing when said piston is in said first position;
    d) conduit and porting means for admitting an amount of pressurized gas from a source to said charge chamber when said piston is in said first position;
    e) means for selectively biasing said piston to said first position while said amount is being admitted to said charge chamber; and
    f) means for selectively biasing said piston toward said second position to open said charge chamber to the exterior of said housing, permitting explosive escape of said pressurized gas from said chamber to the surrounding atmosphere to create an acoustic pulse.

14. A gas gun in accordance with claim 13 wherein said means on said piston for forming a lip seal against said wall comprises a flanged cap larger in diameter than said axial bore and external to said housing.

15. A gas gun in accordance with claim 13 wherein said conduit and porting means for admitting pressurized gas to said charge chamber comprises a manifold relieved in a surface of said axial bore in communication with said source and in selective communication with said charge chamber in said piston.

16. A gas gun in accordance with claim 13 wherein said means for selectively biasing said piston to said first position comprises:

a) an annular flange on said piston extending radially from said piston beyond said axial bore, said flange having a diameter greater than the diameter of said axial bore and an annular surface area equal to the difference between the cross-sectional areas of said piston and said annular flange; and b) a second axial bore within said housing collinear and contiguous with said first axial bore, an annular step being therebetween, said flange being disposed in sealing relation with said piston, said piston bearing against and being movable with respect to a surface of said second axial bore, said flange, piston, step and surface defining a cocking chamber in communication with said pressurized gas source and having a volume variable according to the axial position of said piston, said pressure on said annular surface area causing said cocking chamber to expand to a maximum volume limited by forming of said lip seal between said cap and said wall and exerting thereby a closing force on said lip seal.

17. A gas gun in accordance with claim 13 wherein said means for selectively biasing said piston to said second position comprises:

a) an annular groove defining an activating chamber in said wall contiguous with an annular surface area on said cap when said piston is in said first position, said area being larger than said annular surface area of said flange in said cocking chamber; and b) switching means for selectively connecting said pressurized gas source to said activating chamber to overcome said closing force in said cocking chamber.

18. A gas gun in accordance with claim 13 wherein deselection of said means for biasing said piston to said second position automatically causes said piston to be biased again to said first position.

19. A gas gun in accordance with claim 13 wherein said axial bore ms relieved to provide an auxiliary charge chamber in said housing in communication with said charge chamber in said piston.

* * * * *